(12) United States Patent
Bokämper et al.

(10) Patent No.: US 6,246,191 B1
(45) Date of Patent: Jun. 12, 2001

(54) ELECTROMOTIVE LINEAR DRIVE MECHANISM

(75) Inventors: Ralf Bokämper, Lübbecke; Andreas Roither, Bielefeld, both of (DE)

(73) Assignee: Dewert Antriebs-und Systemtechnik GmbH & Co. KG, Kirchlengern (DE)

( * ) Notice: Subject to any disclaimer, the term of this patent is extended or adjusted under 35 U.S.C. 154(b) by 0 days.

(21) Appl. No.: 09/396,012

(22) Filed: Sep. 15, 1999

(30) Foreign Application Priority Data

Sep. 21, 1998 (DE) .............................................. 298 16 884

(51) Int. Cl.$^7$ .......................... H02K 7/116; F16H 19/02; H16D 21/02
(52) U.S. Cl. ............................. 318/12; 318/15; 318/466; 192/48.8; 272/18; 297/330; 297/345; 74/353; 74/788
(58) Field of Search .................... 318/139, 12, 560–696; 74/89.15, 216.3, 353, 820, 16, 22, 665 GA, 436, 788, 801, 421 A; 297/217, 330, 362.14, 348, 345, 362.11; 272/18; 192/48.8; 248/396, 430, 419; 381/87, 24, 86, 188; 296/65.1

(56) References Cited

U.S. PATENT DOCUMENTS

| | | | |
|---|---|---|---|
| 3,595,093 | * 7/1971 | Du Bois et al. | 74/16 |
| 3,821,902 | * 7/1974 | Du Bois et al. | 74/16 |
| 3,865,430 | * 2/1975 | Tanus | 297/217 |
| 3,923,300 | * 12/1975 | Tanus | 272/18 |
| 4,299,316 | * 11/1981 | Reinmoeller | 192/48.8 |
| 4,470,318 | * 9/1984 | Cremer et al. | 73/353 |
| 4,630,303 | * 12/1986 | Tanno | 381/87 |
| 4,718,291 | * 1/1988 | Wood et al. | 74/89.15 |
| 4,799,403 | * 1/1989 | Dinkel et al. | 74/788 |
| 4,889,379 | * 12/1989 | Aso | 296/65.1 |
| 5,015,035 | * 5/1991 | Stoeckl et al. | 297/345 |
| 5,884,970 | * 3/1999 | Howard | 297/362.14 |
| 5,901,610 | * 5/1999 | Scheider | 74/421 A |
| 5,924,666 | * 7/1999 | Garrido | 248/419 |

\* cited by examiner

*Primary Examiner*—Paul Ip
(74) *Attorney, Agent, or Firm*—Henry M. Feiereisen; Ursula B. Day

(57) ABSTRACT

An electromotive linear drive mechanism, in particular a drive mechanism for a body of furniture, includes an electric motor having an output journal and a rotating spindle which has mounted thereon a nut, secured against rotation. The nut is operatively connected to the body of furniture, for movement in longitudinal direction of the spindle when the spindle rotates. A worm drive includes a worm which rotates about an axis of rotation and is in engagement with the output journal of the electric motor. Connecting the worm drive to the spindle are at least two worm gears which are in engagement with the worm and arranged in symmetric disposition with respect to the rotation axis of the worm. Each worm gear which is connected to a cylindrical gear is in operative engagement with the respective cylindrical gear meshing with the other worm gear.

9 Claims, 2 Drawing Sheets

ELECTROMOTIVE LINEAR DRIVE MECHANISM

CROSS-REFERENCES TO RELATED APPLICATIONS

This application claims the priority of German Patent Application, Ser. No. 298 16 884.7, filed Sep. 21, 1998, the subject matter of which is incorporated herein by reference.

BACKGROUND OF THE INVENTION

The present invention relates, in general, to an electromotive linear drive mechanism, and in particular to a drive mechanism for a body of furniture.

Typical linear drive mechanisms for operating a body of furniture include a rotatable spindle which has placed thereon a nut forming an output member and secured against rotation, and a worm drive with a worm which is wedged onto the output journal of an electric motor. Linear drive mechanisms of this type are known in various designs to suit different use applications, and may be configured as a simple drive, i.e. with an electric motor and a spindle with a spindle nut, or as a dual drive with two electric motors and two threaded spindles with two spindle nuts, accommodated in a common housing. Also included here are small drives with an output of below 1 KW.

In conventional designs of linear drive mechanisms, the worm of the worm drive is made of steel whereas the worm gear, in mesh with the worm, is made from plastics. Although these material selections have been proven suitable, experience has also shown that the output journal of the electric motor, placed onto the worm, bends under load, albeit slightly. As a consequence, the overlap between worm and worm gear diminishes and the contact pressure increases. Thus, the flanks of the worm gear wear off and get crushed. This effect is further compounded during operation of the linear drive mechanism when the output journal of the electric motor heats up.

SUMMARY OF THE INVENTION

It is thus an object of the present invention to provide an improved electromotive linear drive mechanism, obviating the afore-stated drawbacks.

In particular, it is an object of the present invention to provide an improved electromotive linear drive mechanism, which is so constructed as to decrease wear of the worm gear in mesh with the wear, as a consequence of applied forces and possible heat, and to permit a transmission of higher forces.

These objects, and others which will become apparent hereinafter, are attained in accordance with the present invention by providing a worm drive with a worm which is secured to the output journal of an electric motor and in engagement with at least two worm gears arranged in a symmetric disposition with respect to the rotation axis of the worm.

The configuration of the worm drive in accordance with the present invention results in a substantial absorption of forces encountered at the worm during engagement. Thus, the output journal of the electric motor is not prone to flexure, as encountered by conventional drive mechanism to date, and is only loaded by torque being transmitted but not by forces directed perpendicular to its rotation axis.

According to one aspect of the present invention, the two worm gears in engagement with the worm are defined by rotation axes which are offset to one another by 180°, so that the worm gears are oriented in a common plane. Also, the number of components can thereby be kept to a minimum. Depending on the application, it may be appropriate to use the linear drive mechanism for elevation of a structure that is mounted to the spindle nut and for maintaining the structure in the elevated position after turning off the electric motor. Such a demand can be satisfied, by connecting each worm gear with a cylindrical gear which is in engagement with the cylindrical gear meshing with the other worm gear. Thus, a dual worm-cylindrical gear mechanism is realized which is self-locking as the overall efficiency is decreased by both cylindrical gears. The pitch diameter of both cylindrical gears are greater than the outer diameter of the worm gears and contact one another in the plane of the rotation axes of the worm. In addition, such a configuration realizes a distribution of the total torque, introduced by the worm, over two or more worm gears, so that such a gear mechanism is able to transmit a significantly greater maximum torque than a conventional worm gear mechanism.

The assembly can be simplified and the number of components can be kept to a minimum by designing each worm gear with pertaining cylindrical gear of single-piece construction. The cylindrical gears may be spur gears or oblique cylindrical gears.

According to another feature of the present invention, each worm gear and pertaining cylindrical gear may have mounted thereon an outwardly projecting bearing pin for attachment of a rolling-contact bearing or sliding bearing to thereby optimize a support of the worm gears and cylindrical gears. The entire gear mechanism is then supported on four places, thereby realizing a stable arrangement.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
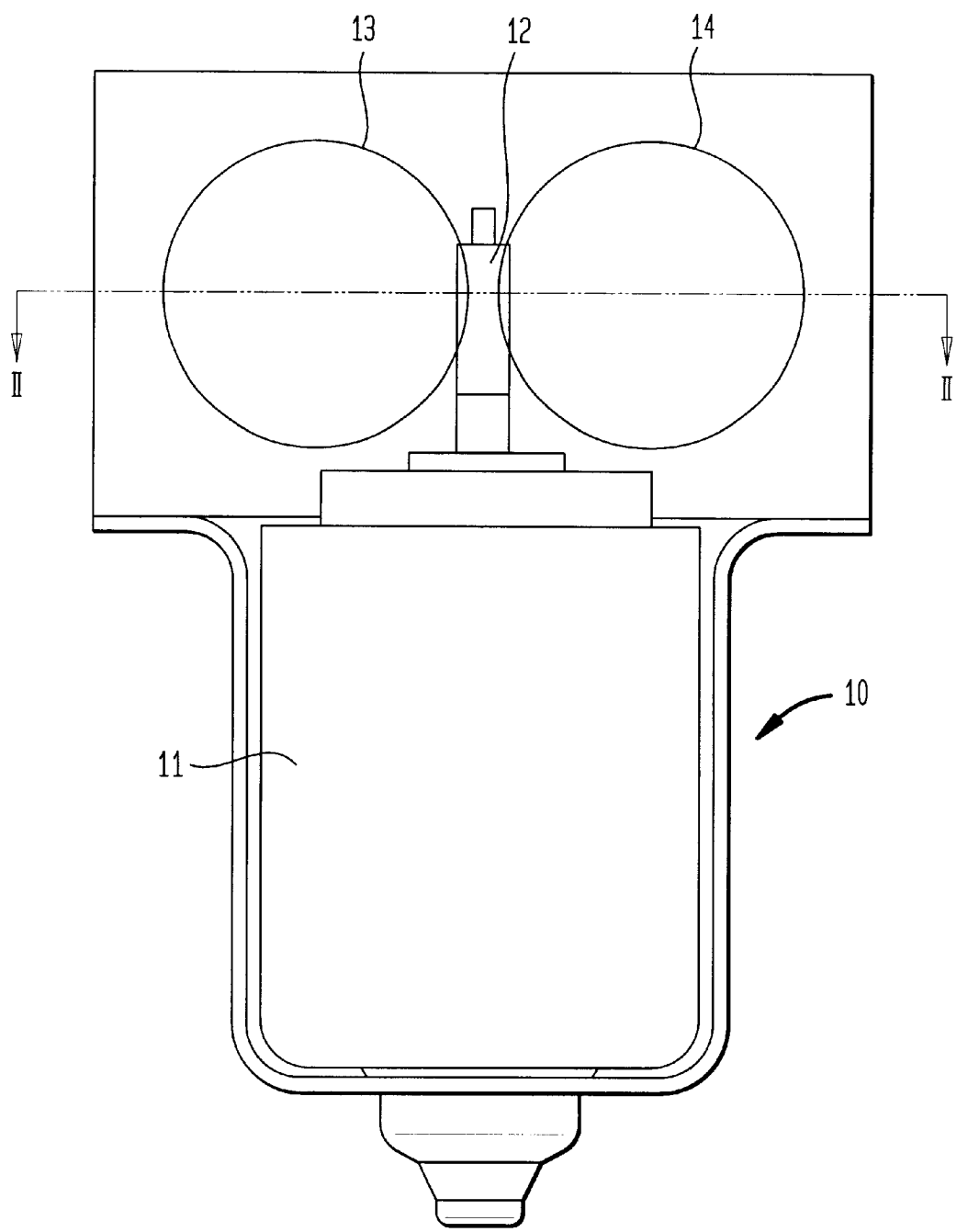
FIG. 1 is a schematic, simplified plan view of a linear drive mechanism according to the present invention.

Throughout all the Figures, same or corresponding elements are generally indicated by same reference numerals.

Turning now to the drawing, and in particular to FIG. 1, there is shown a schematic, simplified plan view of a linear drive mechanism according to the present invention, generally designated by reference numeral 10. The linear drive mechanism 10 includes an electric motor 11, which is not shown in detail for sake of simplicity and has an output journal in the form of a worm 12 which is in mesh on either side thereof with two worm gears 13, 14. Persons skilled in the art will understand that it is certainly conceivable to wedge the worm 12 in fixed rotative engagement on the output journal of the electric motor 11. The worm gears 13, 14 rotate about rotation axes which are arranged offset to one another at an angle of 180°, and are arranged in a symmetric disposition with respect to the rotation axis of the worm 12. In this manner, bending forces can be neutralized and absorbed. Persons skilled in the art will understand that a drive mechanism with more than two worm gears results in a modified angular disposition of the worm gears with respect to one another.

Figure 2:
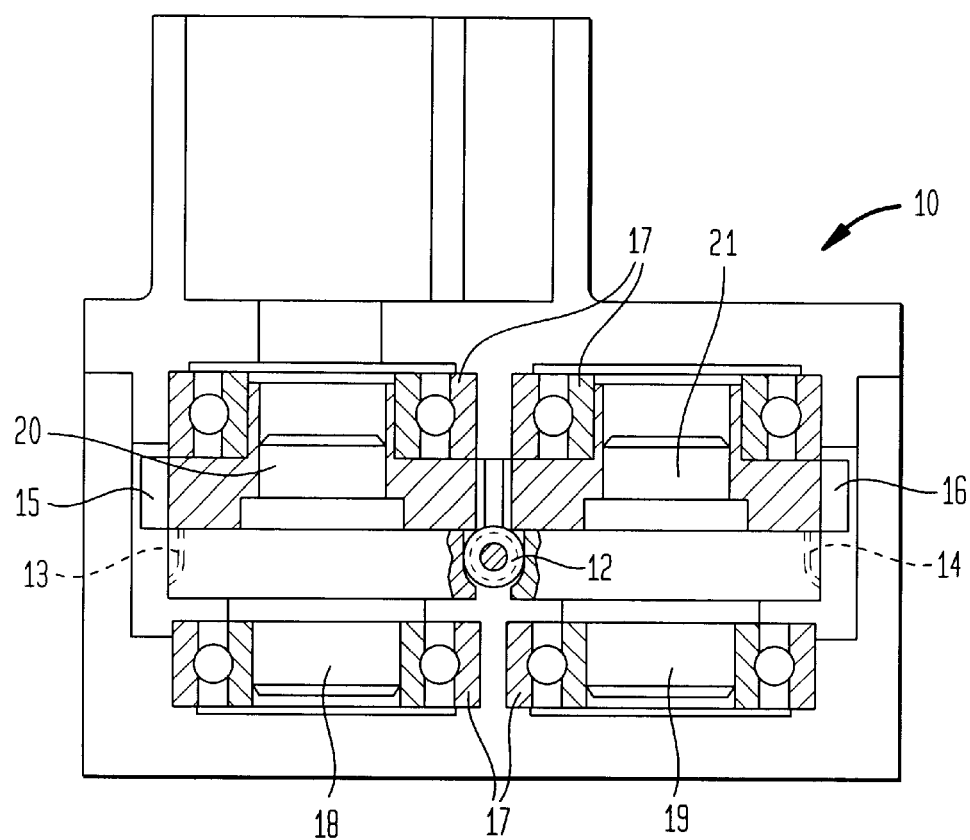
FIG. 2 is a partial, sectional view of the linear drive mechanism, taken along the line II—II in FIG. 1.

Turning now to FIG. 2, there is shown a partial, sectional view of the linear drive mechanism 10, taken along the line II—II in FIG. 1, and it can be seen that each one of the worm gears 13, 14 is connected to a cylindrical gear 15, 16. The worm 12 is made of steel, whereas the worm gears 13, 14 and the cylindrical gears 15, 16 are made of plastics. In order to realize a compact design, the worm gear 13 forms with the cylindrical gear 15 a single-piece structure, and the worm gear 14 forms with the cylindrical gear 16 a single-piece structure.

As shown in FIG. 2, the pitch diameter of each cylindrical gear 15, 16 is greater than the outer diameter of each worm gear 13, 14 so that both cylindrical gears 15, 16 engage one another. The pitch diameter of each cylindrical gear 15, 16 extends tangential to the central longitudinal plane of the worm 12.

Each one of the worm gears 13, 14 is provided on the electric motor proximal side with a pin 18, 19, whereas each one of the cylindrical gears 15, 16 is provided on its electric motor distal side with a pin 20, 21. Each one of the four pins 18, 19, 20, 21 has attached thereon a rolling-contact bearing 17. The pins 18, 19, 20, 21 and the worm gears 13, 14 and the cylindrical gears 15, 16 are formed of single-piece structure, which is injection molded from plastics.

Although not shown in detail, the linear drive mechanism 10 is operated by a threaded spindle which is in fixed rotative engagement with one of the cylindrical gears 15, 16 and, optionally, with the associated one of the worm gears 13, 14. The threaded spindle has mounted thereon a spindle nut which is operatively connected to the structure being adjusted.

While the invention has been illustrated and described as embodied in an electromotive linear drive mechanism, it is not intended to be limited to the details shown since various modifications and structural changes may be made without departing in any way from the spirit of the present invention.

What is claimed as new and desired to be protected by Letters Patent is set forth in the appended claims:

1. An electromotive linear drive mechanism, in particular a drive for a body of furniture, comprising:

an electric motor having an output journal;

a rotating spindle having mounted thereon a nut, secured against rotation, for movement in longitudinal direction of the spindle when the spindle rotates;

a worm drive including a worm in engagement with the output journal of the electric motor, said worm rotating about a rotation axis; and power transmitting means for connecting the worm drive to the spindle, said power-transmitting means including at least two worm gears which are in engagement with the worm and arranged in symmetric disposition with respect to the rotation axis of the worm.

2. The linear drive mechanism of claim 1, wherein the worm gears rotate about axes of rotation which are arranged offset to one another at an angle of 180°.

3. The linear drive mechanism of claim 1, wherein the power transmitting means includes two cylindrical gears in mesh with one another, with one of the cylindrical gears connected to one of the worm gears, and with the other one of the cylindrical gears connected to the other one of the worm gears.

4. The linear drive mechanism of claim 3, wherein the one cylindrical gear and the one worm gear form a single-piece part, and the other cylindrical gear and the other worm gear form a single-piece part.

5. The linear drive mechanism of claim 3 wherein the cylindrical gear are defined by a pitch diameter which is greater than an outer diameter of the worm gears.

6. The linear drive mechanism of claim 3, and further comprising bearing journals, each of the worm gears and each of the cylindrical gears having formed thereon a one of said bearing journals for support of a rolling-contact bearing or a sliding bearing.

7. The linear drive mechanism of claim 3, wherein the worm gears and the cylindrical gears are made from plastic material through an injection molding process.

8. The linear drive mechanism of claim 3 wherein the spindle is a threaded spindle in fixed rotative engagement with one of the cylindrical gears and, optionally, with the one of the worm gears associated to the one cylindrical gear.

9. The linear drive mechanism of claim 1 wherein the worm is wedged onto the output journal of the electric motor.

\* \* \* \* \*